Aug. 17, 1965 M. J. KELLY 3,200,539
COMBINATION HEATING, IRRIGATING, AND FERTILIZING SYSTEM
Filed May 10, 1963 2 Sheets-Sheet 1

INVENTOR.
MARVIN J. KELLY,
BY
McMorrow, Berman + Davidson
ATTORNEYS.

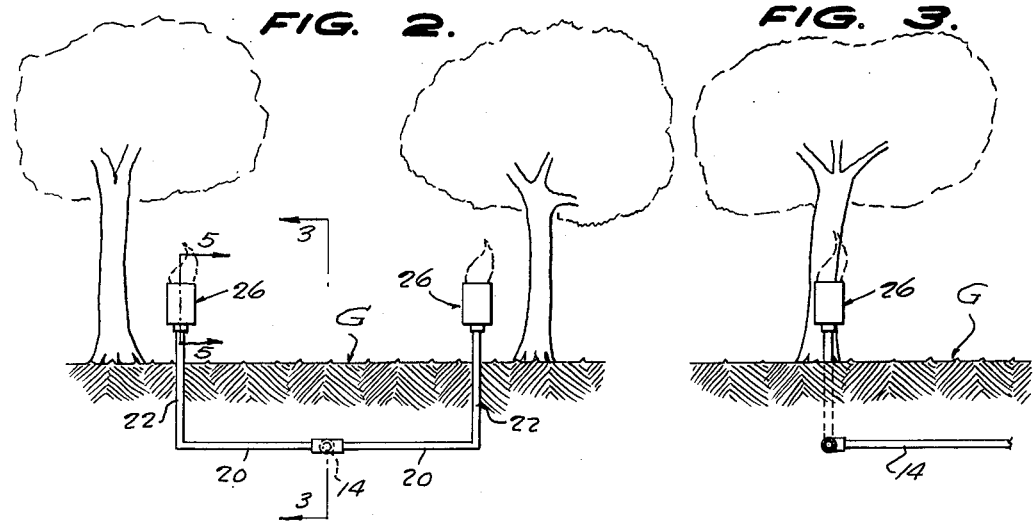

3,200,539
COMBINATION HEATING, IRRIGATING, AND FERTILIZING SYSTEM
Marvin J. Kelly, Merritt Island, Fla., assignor to Elements Control Systems, Inc., Winter Park, Fla., a corporation of Florida
Filed May 10, 1963, Ser. No. 279,405
2 Claims. (Cl. 47—1)

This invention relates to an novel combination heating, irrigating, and fertilizing system for orchards, and other outdoor cultivations.

The primary object of the invention is the provision of a more efficient, more practical, and more easily used system of the kind indicated, which is readily adjusted for separate heating, irrigating, and fertilizing operations, or a combined irrigating and fertilizing operation, without alterations of or additions to the system.

Another object of the invention is the provision of a simpler, more economical, and labor-saving system of the character indicated above, wherein discharge heads, adapted to be located above ground adjacent to individual trees or shrubs, serve the dual purposes of gas burners and fluid nozzles.

A further object of the invention is the provision of a system of the character indicated above, wherein the sole source of pressure to force gas to the heads, under controlled and regulable pressure, in a heating operation, is provided by suitable gas under pressure in a tank, such as a propane tank, equipped with a pressure regulating valve, whereby the need for pumping equipment for this purpose is desirably eliminated.

Other important objects and advantageous features of the invention will be apparent from the following description and the accompanying drawings, wherein, for purposes of illustration only, a specific form of the invention is set forth in detail.

In the drawings:

FIGURE 2 is an enlarged fragmentary vertical section taken on the lines 2—2 of FIGURE 1;

FIGURE 3 is an enlarged fragmentary vertical section taken at right angles to FIGURE 2 on the lines 3—3 of FIGURE 2;

FIGURE 4 is an enlarged top plan of a discharge head;

FIGURE 5 is a vertical section taken on the lines 5—5 of FIGURE 2, on the scale of FIGURE 4; and, FIGURE 6 is a vertical section taken on the lines 6—6 of FIGURE 5.

Figure 1:
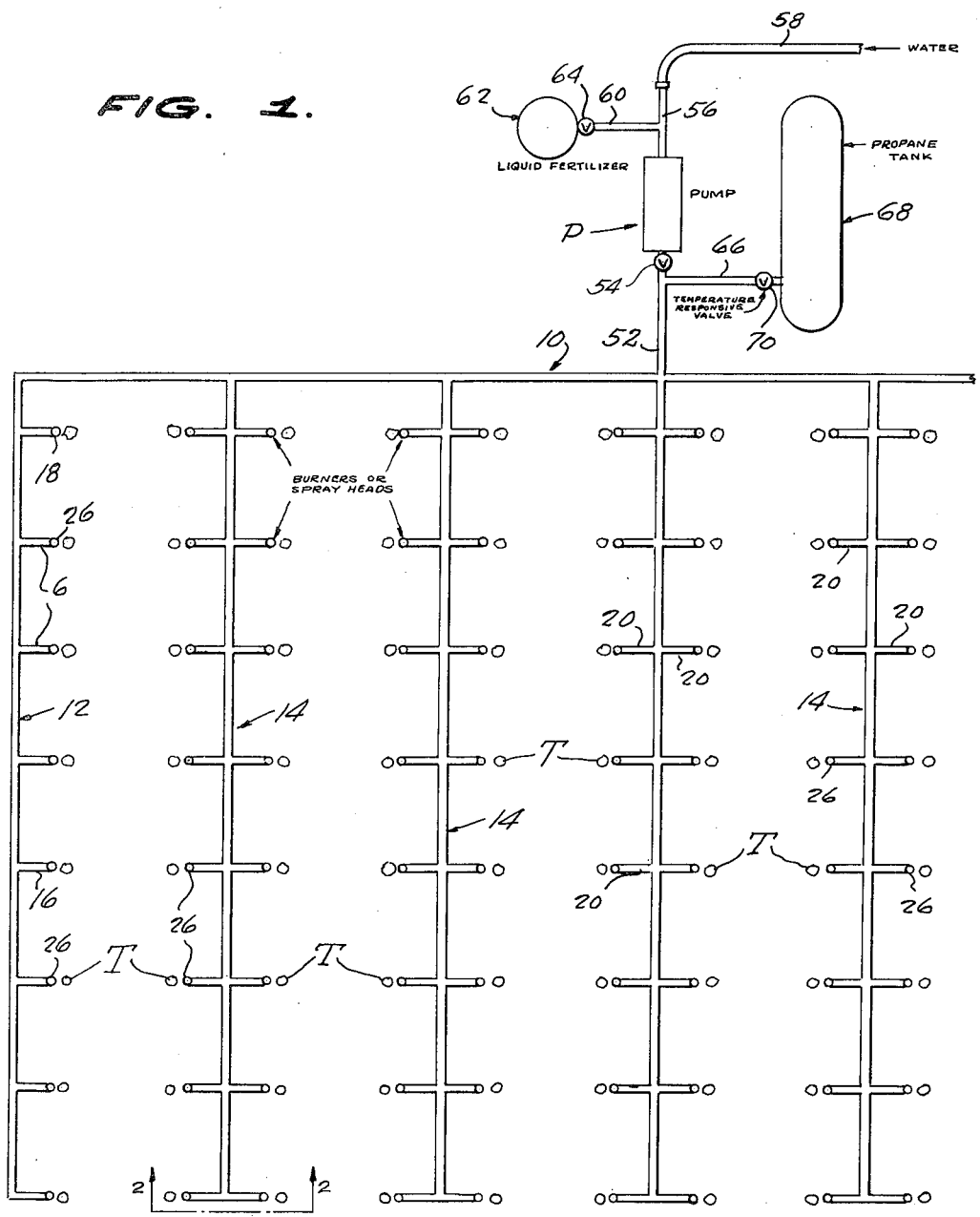
FIGURE 1 is a schematic plan view of an installed system of the present invention.

Referring in detail to the drawings, wherein like numerals designate like parts throughout the several views, the illustrated system involves an orchard having spaced parallel single and double rows of spaced trees T, the trees in the rows being longitudinally aligned, and rising above the level of the ground G. A pipe assembly, which is preferably buried in the ground G, but can be laid thereon, can be composed of either metal or plastic tubing, or combinations thereof.

The illustrated pipe assembly comprises a single longitudinal header pipe 10, which extends along one end of the tree rows, and has connected thereto, at its ends single branches 12, and at points therebetween dual branches 14, the branches being positioned between and being equidistant from trees T in the rows. The single branches 12 have connected thereto, at one side only, single discharge arms 16, which reach close to related trees, and terminate in upstanding perpendicular risers 18.

The dual branches 14 have connected to opposite sides thereof, longitudinally aligned discharge arms 20, each of which terminates in an upstanding perpendicular riser 22.

The risers 18 and 22 reach to common levels above or below the surface of the ground G, and have externally threaded upper ends 24, onto which are threaded combined burner-nozzle heads 26.

The burner-nozzle heads 26 comprise vertically elongated square or round tubular housings 30 which have open upper and lower ends 32 and 34, respectively, the housings 30 being greatly larger in diameter than the risers. Secured, as by welding 36 to opposed walls 38 of the housings and across the housings 30, on levels adjacent to their lower ends 34, are horizontal plates 40 which are narrower than the housings and have parallel side edges 42, which are equally spaced, at predetermined distances from the other opposed walls 44 of the housings. The width of the air slots 46, defined between the side edges 42 of the plates 40 and the housing walls 44, determines the rate of flow, up through the housings 30, of outside air, for sustaining combustion, when the heads are supplied with gas, under pressure, for a heating operation. The plates 40 have centrally located, downwardly extending sockets 48, which thread onto the upper ends of the risers.

The plates 40 are formed, in their centers, with relatively small diameter vertical jet bores 50, which are on the vertical centerlines of the housings 30, which serve to jet upwardly into and above the housings, either combustible gas, irrigation water, liquid fertilizer, or a commination of irrigation water and entrained fertilizer, in the immediate vicinity of the bases of the trees T.

A single feed pipe 52 is connected to the outer side of the head pipe 10, preferably near the central one of the dual branches 14, which is connected to the discharge of a suitable pressure pump P, through an adjustable valve 54. The pump P has a single intake pipe 56, to which a hose 58, leading from any suitable source of water, is connected.

A lateral pipe 60, leading from a liquid fertilizer tank 62, through an adjustable valve 64, is connected to the intake pipe 56. Another lateral pipe 66 leads from the feed pipe 52 to a combustible gas pressure tank, such as a propane tank 68, through a pressure controlling valve 70. The valve 70 can be one which is thermostatically operated, so that, in a heating operation, the valve 70 is automatically opened to supply gas under pressure, with the valves 54 and 64 closed, to the heads 28, when the outside temperature is below predetermined minimum safety level for the trees T; and automatically closed when a predetermined elevation of the outside temperature has been produced.

For an irrigating operation, the gas valve 70 and the fertilizer valves 64 are closed, and the pump valve 54 is opened and the pump P is operated to supply water only to the heads 26 from which the water is sprayed out of the heads 26 onto the ground around the bases of the trees T.

For a fertilizing operation, the gas valve 70 is closed, and the fertilizer valve 64 and the water valve 54 are opened, and the pump P is operated, so as to draw fertilizer from the fertilizer tank 62 and force it through the feeder pipe 52 into the header pipe 10 and discharge it through the heads 26.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

1. In a system of the character described, a header pipe, branch pipes extending from a side of and connected at one end to the header pipe at spaced points along the header pipe, the other ends of the branch pipes being closed, lateral discharge pipes spaced along and connected to the branch pipes, said discharge pipes terminating in upstanding discharge heads adapted to be positioned close to trees, said heads comprising vertical rectangular housings having open upper and lower ends, rectangular horizontal plates relatively smaller than said housings secured within and extending across the lower ends of the housings, said plates each having depending coupling sockets, said sockets having centered small diameter vertical jet means communicating with the risers and the said rectangular housings, said plates having opposite side edges spaced from adjacent opposite side walls of the housings which define air slots for primary air supply with fuel supply from said jet means, means to supply various fluids under pressure to the header pipe to said discharge heads, said supply means comprising a feed pipe connected to the header pipe, a combustible gas pressure tank connected to the feed pipe, a thermostatically controlled valve connected between the feed pipe and gas tank, a force pump having a discharge connected to the feed pipe, a water valve connected between the discharge and the feed pipe, said pump having an intake pipe to which a suitable source of water is adapted to be connected, a fluid fertilizer tank connected to the intake pipe, and a fertilizer valve connected between the fertilizer tank and the intake pipe.

2. In a system of the character described, a header pipe, branch pipes extending from a side of and connected at one end to the header pipe at spaced points along the header pipe, the other ends of the branch pipes being closed, lateral discharge pipes spaced along and connected to the branch pipes, said discharge pipes terminating in upstanding discharge heads adapted to be positioned close to trees, said heads comprising housings having open front and rear ends, plates relatively smaller than said housings secured within an extending across the rear ends of the housings, said plates each having depending coupling sockets, said sockets having centered small diameter jet means communicating with the risers and the respective interior of each of said housings, said plates having opposite side edges spaced from adjacent opposite side walls of the housings which define air slots for primary air supply with fuel supply from said jet means, means to supply various fluids under pressure to the header pipe to said discharge heads, said supply means comprising a feed pipe connected to the header pipe, a combustible gas pressure tank connected to the feed pipe, a valve connected between the feed pipe and said gas tank, a force pump having a discharge connected to the feed pipe, a valve connected between the discharge and the feed pipe, said pump having an intake pipe to which a suitable source of water is adapted to be connected, a fluid fertilizer tank connected to the intake pipe, and a valve connected between the fertilizer tank and the intake pipe.

References Cited by the Examiner

UNITED STATES PATENTS

| | | |
|---|---|---|
| 1,571,969 | 2/26 | Ruprecht. |
| 1,758,941 | 5/30 | Gibson _____ 47—2 X |
| 1,961,877 | 6/34 | Gars _____ 47 |
| 1,991,851 | 2/35 | Hammell. |
| 2,286,366 | 6/42 | Lea. |
| 3,067,541 | 12/62 | Smith _____ 47—2 |

ABRAHAM G. STONE, *Primary Examiner.*

T. GRAHAM CRAVER, *Examiner.*